US012774660B2

(12) United States Patent
Binek et al.

(10) Patent No.: US 12,774,660 B2
(45) Date of Patent: Oct. 27, 2026

(54) DIFFUSER-TURBINE FLOW NETWORK

(71) Applicant: RTX Corporation, Farmington, CT (US)

(72) Inventors: Lawrence A. Binek, Glastonbury, CT (US); Jose R. Paulino, Jupiter, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/767,185

(22) Filed: Jul. 9, 2024

(65) Prior Publication Data

US 2026/0015945 A1 Jan. 15, 2026

(51) Int. Cl.

| | |
|---|---|
| ***F01D 9/04*** | (2006.01) |
| ***F02C 3/05*** | (2006.01) |
| ***F04D 29/44*** | (2006.01) |
| ***F04D 29/58*** | (2006.01) |

(52) U.S. Cl.

CPC ........... *F01D 9/041* (2013.01); *F04D 29/444* (2013.01); *F04D 29/5846* (2013.01); *F02C 3/05* (2013.01); *F05D 2240/128* (2013.01); *F05D 2260/202* (2013.01)

(58) Field of Classification Search

CPC ..... F01D 9/00; F01D 9/02; F01D 9/04; F01D 9/041; F01D 9/042; F04D 29/441; F04D 29/444; F05D 2260/202; F05D 2240/128; F23R 3/50; F02C 3/04; F02C 3/05

See application file for complete search history.

(56) References Cited

U.S. PATENT DOCUMENTS

| | | | |
|---|---|---|---|
| 5,101,620 A | 4/1992 | Shekleton et al. | |
| 8,641,373 B2 | 2/2014 | Porodo et al. | |
| 11,262,077 B2 | 3/2022 | Binek et al. | |
| 11,359,543 B2 | 6/2022 | Binek et al. | |
| 11,614,002 B2 | 3/2023 | Binek et al. | |
| 11,713,693 B2 | 8/2023 | Whitaker et al. | |
| 2016/0003260 A1* | 1/2016 | Suciu ........................ | F02C 6/08 415/207 |

(Continued)

FOREIGN PATENT DOCUMENTS

GB 1338347 11/1973

OTHER PUBLICATIONS

Extended European Search Report for counterpart EP Application No. 25188013.4 mailed Jan. 7, 2026.

*Primary Examiner* — Elton K Wong

(74) *Attorney, Agent, or Firm* — Bachman & LaPointe, P.C.

(57) ABSTRACT

A compressor diffuser vane and turbine nozzle vane flow network including at least one suction point formed in a suction side of the compressor diffuser vane; a suction flow passage fluidly coupled to the at least one suction point; a main artery formed within an outer platform, the outer platform in operative communication with the compressor diffuser vane, the main artery formed within the turbine nozzle vane, the turbine nozzle vane in operative communication with the outer platform, the main artery formed within an inner platform, the inner platform in operative communication with the turbine nozzle vane; film hole passages fluidly coupled to the main artery; and at least one film hole formed in the inner platform, the at least one film hole fluidly coupled to the main artery.

17 Claims, 5 Drawing Sheets

(56) References Cited

U.S. PATENT DOCUMENTS

| | | | | |
|---|---|---|---|---|
| 2016/0032764 | A1* | 2/2016 | Tibbott | F01D 9/047 415/116 |
| 2017/0175636 | A1* | 6/2017 | Hughes | F23R 3/002 |
| 2019/0063313 | A1 | 2/2019 | Rez et al. | |
| 2020/0102844 | A1 | 4/2020 | Binek et al. | |
| 2020/0340362 | A1 | 10/2020 | Madonna et al. | |
| 2020/0362724 | A1* | 11/2020 | Binek | F23R 3/54 |

* cited by examiner

DIFFUSER-TURBINE FLOW NETWORK

BACKGROUND

The disclosure relates to gas turbine engines. More particularly, the disclosure relates to a compressor diffuser vane and turbine vane flow network for attritable engines.

Gas turbine engines (used in propulsion and power applications and broadly inclusive of turbojets, turboprops, turbofans, turboshafts, prop fans, industrial gas turbines, and the like) have spawned attritable variants particularly for turbojet, turbofan, and turboprop uncrewed aerial vehicles (UAV).

Example attritable engines are shown in U.S. Pat. No. 11,359,543B2 (the '543 patent) of Binek et al., issued Jun. 14, 2022, and entitled "Attritable Engine Additively Manufactured Inlet Cap" and U.S. Pat. No. 11,614,002B2 (the '002 patent) of Binek et al., issued Mar. 28, 2023, and entitled "Split Case Structure for a Gas Turbine Engine."

The disclosures of the '543 patent and '002 patent are incorporated by reference herein in their entireties as if set forth at length.

Attritable engine systems, by definition, are expendable and life limited. As such, design spaces can be enabled using additive manufacturing (AM). By implementing additive manufacturing advantages such as unitization, it is possible to develop a low-part count, single build engine within the AM process envelope coupled with minimal post processing. The baseline and additive configurations have shown significant flow separation occurring in the compressor diffuser airfoil section which negatively impacts performance. In a unitized configuration (using, for example, Powder Bed Fusion-Laser Beam additive manufacturing), post processing the diffuser vanes is very challenging.

SUMMARY

In accordance with the present disclosure, there is provided a compressor diffuser vane and turbine nozzle vane flow network comprising at least one suction point formed in a suction side of the compressor diffuser vane; a suction flow passage fluidly coupled to the at least one suction point; a main artery formed within an outer platform, the outer platform in operative communication with the compressor diffuser vane, the main artery formed within the turbine nozzle vane, the turbine nozzle vane in operative communication with the outer platform, the main artery formed within an inner platform, the inner platform in operative communication with the turbine nozzle vane; film hole passages fluidly coupled to the main artery; and at least one film hole formed in the inner platform, the at least one film hole fluidly coupled to the main artery.

A further embodiment of any of the foregoing embodiments may additionally and/or alternatively include the suction flow passage is formed within the compressor diffuser vane.

A further embodiment of any of the foregoing embodiments may additionally and/or alternatively include the at least one film hole is formed in the inner platform proximate an outer forward surface.

A further embodiment of any of the foregoing embodiments may additionally and/or alternatively include the main artery formed within the turbine nozzle vane includes multiple cooling passages configured in a serpentine pattern.

A further embodiment of any of the foregoing embodiments may additionally and/or alternatively include the at least one film hole being configured to produce a film layer over the inner platform providing an insulating protective function from hot gases flowing toward a turbine section.

A further embodiment of any of the foregoing embodiments may additionally and/or alternatively include the at least one suction point being configured to prevent a flow separation from the suction side by maintaining flow proximate to the suction side of the compressor diffuser vane.

A further embodiment of any of the foregoing embodiments may additionally and/or alternatively include the main artery within the turbine nozzle vane being configured such that air flowing within the main artery removes thermal energy from the turbine nozzle vane, the thermal energy being produced from exposure to hot gases flowing across the turbine nozzle vane.

In accordance with the present disclosure, there is provided a gas turbine engine with compressor diffuser vane and turbine nozzle vane flow network comprising a compressor section including a compressor diffuser vane; a turbine section including a turbine nozzle vane downstream from the compressor diffuser vane; at least one suction point formed in a suction side of the compressor diffuser vane; a suction flow passage fluidly coupled to the at least one suction point; a main artery formed within an outer platform, the outer platform in operative communication with the compressor diffuser vane, the main artery formed within the turbine nozzle vane, the turbine nozzle vane in operative communication with the outer platform, the main artery formed within an inner platform, the inner platform in operative communication with the turbine nozzle vane; film hole passages fluidly coupled to the main artery; and at least one film hole formed in the inner platform, the at least one film hole fluidly coupled to the main artery.

A further embodiment of any of the foregoing embodiments may additionally and/or alternatively include the suction flow passage is formed within the compressor diffuser vane.

A further embodiment of any of the foregoing embodiments may additionally and/or alternatively include the at least one film hole is formed in the inner platform proximate an outer forward surface.

A further embodiment of any of the foregoing embodiments may additionally and/or alternatively include the at least one film hole being configured to produce a film layer over the inner platform providing an insulating protective function from hot gases flowing toward a turbine section.

A further embodiment of any of the foregoing embodiments may additionally and/or alternatively include the at least one suction point being configured to prevent a flow separation from the suction side by maintaining flow proximate to the suction side of the compressor diffuser vane.

A further embodiment of any of the foregoing embodiments may additionally and/or alternatively include the main artery within the turbine nozzle vane being configured such that air flowing within the main artery removes thermal energy from the turbine nozzle vane, the thermal energy being produced from exposure to hot gases flowing across the turbine nozzle vane.

In accordance with the present disclosure, there is provided a process for comprising forming a compressor section including a compressor diffuser vane; forming a turbine section including a turbine nozzle vane downstream from the compressor diffuser vane; forming at least one suction point in a suction side of the compressor diffuser vane; forming a suction flow passage fluidly coupled to the at least one suction point; forming a main artery within an outer platform, the outer platform in operative communication with the compressor diffuser vane; forming the main artery within the turbine nozzle vane, the turbine nozzle vane in operative communication with the outer platform; forming the main artery within an inner platform, the inner platform in operative communication with the turbine nozzle vane; fluidly coupling film hole passages to the main artery; and forming at least one film hole in the inner platform; fluidly coupling the at least one film hole to the main artery.

A further embodiment of any of the foregoing embodiments may additionally and/or alternatively include the process further comprising forming the suction flow passage within the compressor diffuser vane.

A further embodiment of any of the foregoing embodiments may additionally and/or alternatively include the process further comprising forming the at least one film hole in the inner platform proximate an outer forward surface.

A further embodiment of any of the foregoing embodiments may additionally and/or alternatively include the process further comprising forming the main artery within the turbine nozzle vane as multiple cooling passages configured in a serpentine pattern.

A further embodiment of any of the foregoing embodiments may additionally and/or alternatively include the process further comprising configuring the at least one film hole to produce a film layer over the inner platform providing an insulating protective function from hot gases flowing toward a turbine section.

A further embodiment of any of the foregoing embodiments may additionally and/or alternatively include the process further comprising configuring the at least one suction point to prevent a flow separation from the suction side by maintaining flow proximate to the suction side of the compressor diffuser vane.

A further embodiment of any of the foregoing embodiments may additionally and/or alternatively include the process further comprising configuring the main artery within the turbine nozzle vane to flow air within the main artery to remove thermal energy from the turbine nozzle vane, the thermal energy being produced from exposure to hot gases flowing across the turbine nozzle vane.

Other details of the compressor diffuser vane and turbine vane flow network are set forth in the following detailed description and the accompanying drawings wherein like reference numerals depict like elements.

DETAILED DESCRIPTION

Figure 1:
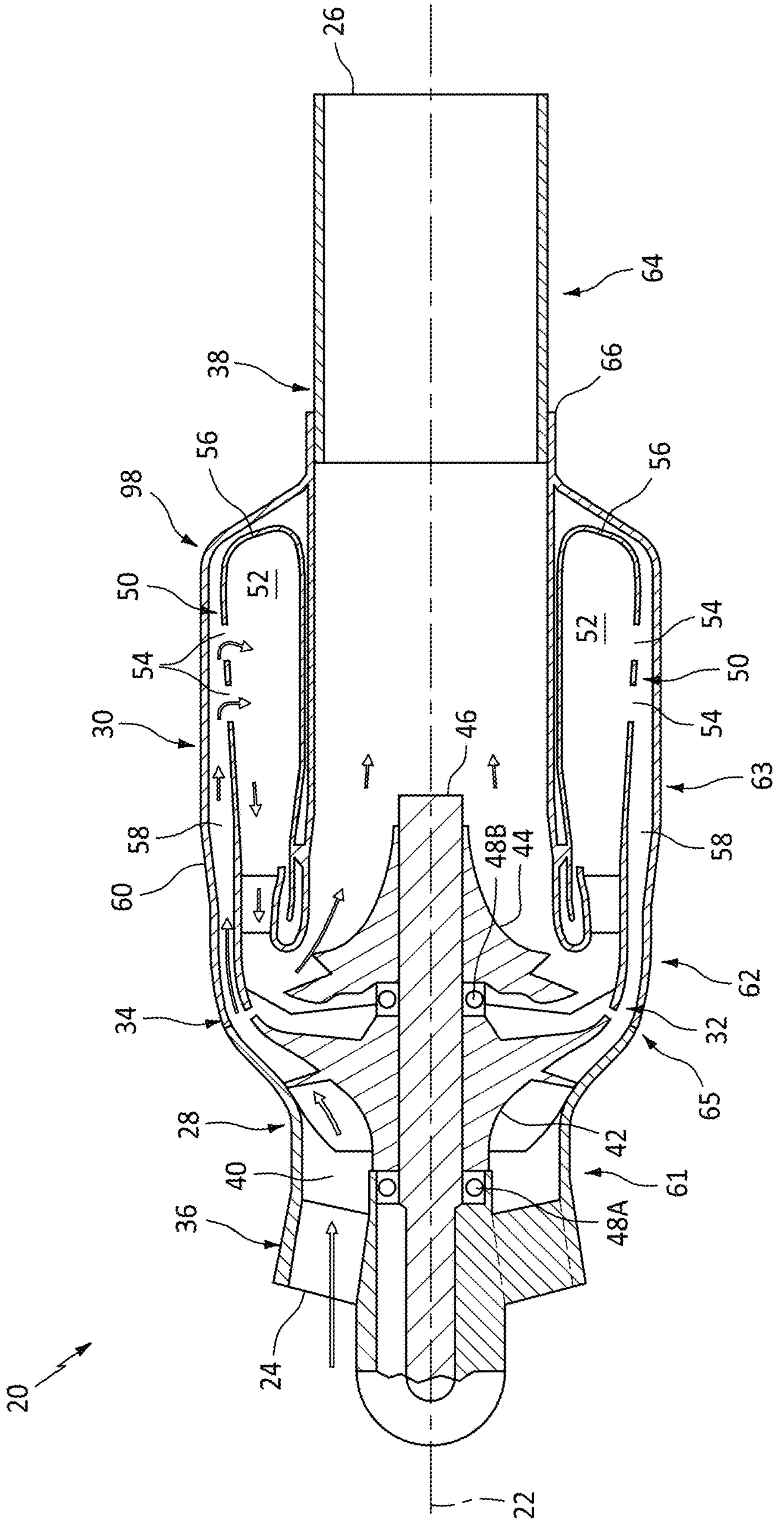
FIG. 1 is a schematic representation of an exemplary central longitudinal sectional view of a gas turbine engine.

FIG. 1 is a schematic central longitudinal sectional illustration of a gas turbine engine 20. The gas turbine engine 20 of FIG. 1 is configured as a single spool, radial-flow turbojet turbine engine. This gas turbine engine 20 is configured for propelling an aircraft such as, but not limited to, an unmanned aerial vehicle (UAV), a drone or any other manned or unmanned aircraft or self-propelled projectile. The present disclosure, however, is not limited to such an example turbojet turbine engine configuration nor to an aircraft propulsion system application. For example, the gas turbine engine 20 may alternatively be configured as a turboshaft, a turboprop, an auxiliary power unit (APU), and/or an industrial gas turbine.

The gas turbine engine 20 of FIG. 1 extends axially along an axial centerline 22 between a forward, upstream airflow inlet 24 and an aft, downstream exhaust 26. This axial centerline 22 may also be a rotational axis for various components within the gas turbine engine 20.

The gas turbine engine 20 includes a compressor section 28, a combustor section 30, and a turbine section 32. The gas turbine engine 20 also includes a static engine structure 34. This static engine structure 34 houses the compressor section 28, the combustor section 30, and the turbine section 32. The static engine structure 34 of FIG. 1 also forms an inlet section 36 and an exhaust section 38 for the gas turbine engine 20, where the inlet section 36 forms the airflow inlet 24 and the exhaust section 38 forms the exhaust 26.

The engine sections 36, 28, 30, 32 and 38 are arranged sequentially from upstream to downstream along a gas path or core flow path 40 that extends through the gas turbine engine 20 from the airflow inlet 24 to the exhaust 26. Each of the engine sections 28 and 32 includes a respective compressor rotor 42 and turbine rotor 44. The example rotors are co-spooled to rotate as a unit. Each of these rotors 42, 44 includes a plurality of rotor blades arranged circumferentially around and connected to at least one respective rotor hub (for centrifugal or disk for axial). The rotor blades, for example, may be formed integral with or mechanically fastened, welded, brazed, adhered and/or otherwise attached to the respective rotor disk(s).

The compressor rotor 42 may be configured as a centrifugal/radial flow rotor. The turbine rotor 44 may also be configured as a radial flow rotor. The compressor rotor 42 is connected to the turbine rotor 44 through a shaft 46. This shaft 46 is rotatably supported by the static engine structure 34 through a plurality of bearings 48A and 48B (generally referred to as 48); e.g., rolling element bearings, journal bearings, etc.

Figure 2:
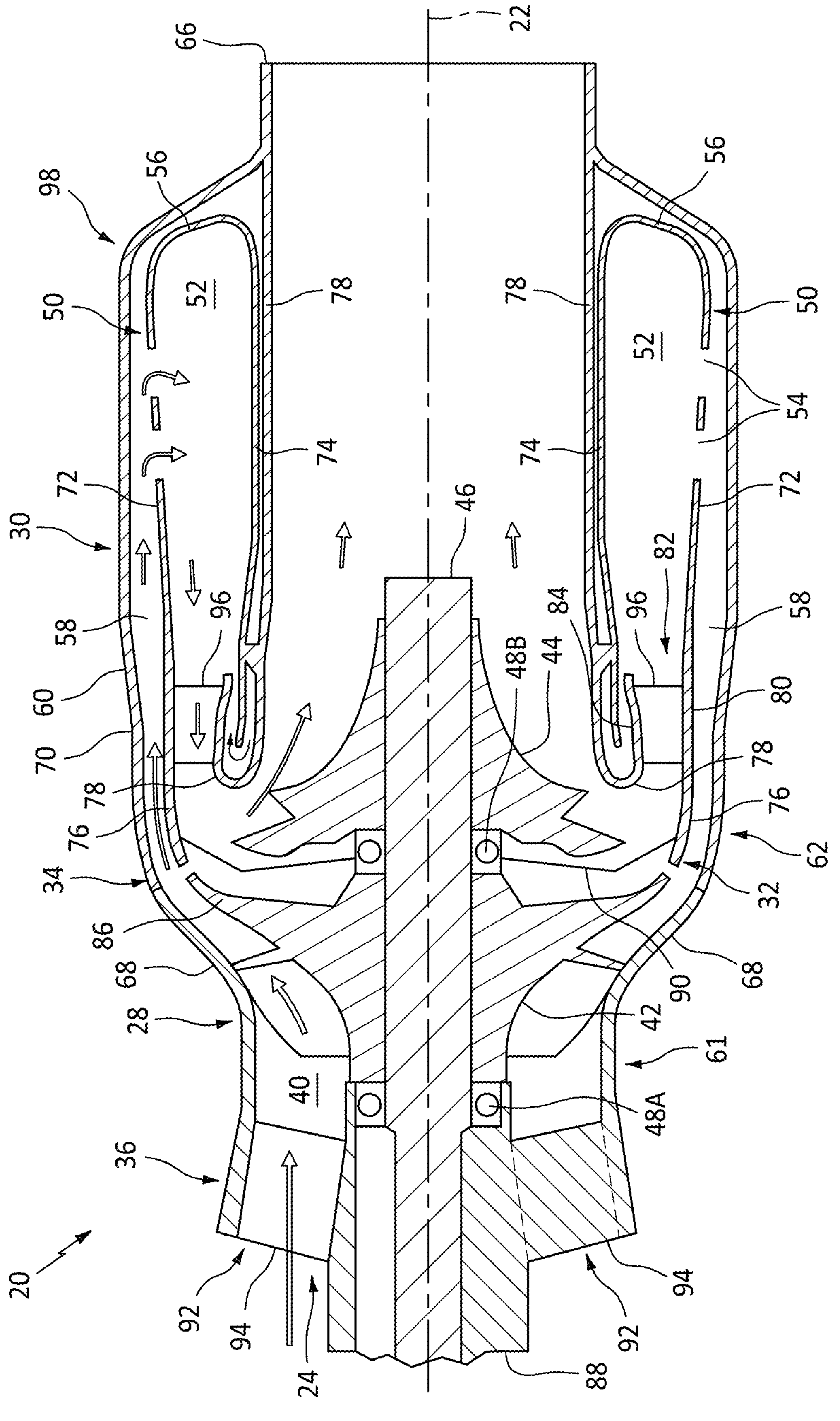
FIG. 2 is a schematic representation of an enlarged view of a portion of the engine of FIG. 1.

The combustor section 30 includes an example annular combustor 50 with an annular combustion chamber 52. The combustor 50 of FIG. 2 is configured as a reverse flow combustor. Inlets ports/flow tubes 54 into the combustion chamber 52, for example, may be arranged at (e.g., on, adjacent or proximate) and/or towards an aft bulkhead wall 56 of the combustor 50. An outlet from the combustor 50 may be arranged axially aft of an inlet to the turbine section 32. The combustor 50 may also be arranged radially outboard of and/or axially overlap at least a (e.g., aft) portion of the turbine section 32. With this arrangement, the core flow path 40 of FIG. 1 reverses direction (e.g., from a forward-to-aft direction to an aft-to-forward direction) a first time as the flow path 40 extends from a diffuser plenum 58 surrounding the combustor 50 into the combustion chamber 52. The core flow path 40 of FIG. 1 then reverses direction (e.g., from the aft-to-forward direction to the forward-to-aft direction) a second time as the flow path 40 extends from the combustion chamber 52 into the turbine section 32.

During operation, air enters the gas turbine engine 20 through the inlet section 36 and its airflow inlet 24. The inlet section 36 directs this air from the airflow inlet 24 into the core flow path 40 and the compressor section 28. The airflow inlet 24 of FIG. 1 thereby forms a forward, upstream inlet to the core flow path 40 and the compressor section 28. The air within the core flow path 40 may be referred to as core air.

The core air is compressed by the compressor rotor 42 and directed through a diffuser 60 and diffuser plenum 58 into the combustion chamber 52. Fuel is injected and mixed with the compressed core air to provide a fuel-air mixture. This fuel-air mixture is ignited within the combustion chamber 52, and combustion products thereof flow through the turbine section 32 and cause the turbine rotor 44 to rotate. This rotation of the turbine rotor 44 drives rotation of the compressor rotor 42 and, thus, compression of the air received from the airflow inlet 24. The exhaust section 38 receives the combustion products from the turbine section 32. The exhaust section 38 directs the received combustion products out of the gas turbine engine 20 to provide forward engine thrust.

The static engine structure 34 of FIG. 1 may include some or all static engine components included in the gas turbine engine 20. Herein, the term "static" may describe a component that does not rotate with the rotating assembly or spool (e.g., an assembly of the rotors 42 and 44 and the shaft 46) during gas turbine engine operation. A static component, for example, may refer to any component that remains stationary during gas turbine engine operation such as, but not limited to, a wall, a liner, a strut, a fixed vane, a fuel nozzle, a conduit, etc. The static engine structure 34 of FIG. 1, for example, includes a forward, case structure 62 and an aft, exhaust duct structure 64.

The example case structure 62 of FIG. 1 is configured as a generally tubular structure formed in two general sections: an inlet/compressor case 61; and a diffuser/combustor/turbine case 63. The case structure 62, for example, extends axially along the axial centerline 22 from the forward airflow inlet 24 to an outlet 66 from the turbine section 32. The case structure 62 also extends circumferentially about (e.g., completely around) the axial centerline 22 such that the case structure 62 has, for example, a full hoop geometry. The two sections 61, 63 may be secured to each other at a bolt flange joint 65.

The case structure 62 includes one or more case walls. The inlet/compressor case 61 of FIG. 1, for example, includes a compressor wall 68. The diffuser/combustor/turbine case 63 and its FIG. 3 main piece 200 have a diffuser wall 70, an outer combustor wall 72 of the combustor 50, an inner combustor wall 74 of the combustor 50, the bulkhead wall 56 of the combustor 50, an outer turbine wall 76 and an inner turbine wall 78. Each of these case walls 56, 68, 70, 72, 74, 76 and/or 78 may be generally tubular or generally annular. Each of the case walls 68, 70, 72, 74, 76, 78 of FIG. 2, for example, is tubular, and the bulkhead wall 56 is annular.

The compressor wall 68 extends axially along the axial centerline 22 between and is connected to the inlet section 36 and the diffuser wall 70. The compressor wall 68 of FIG. 2 circumscribes, axially overlaps and thereby houses the compressor rotor 42.

Figure 3:
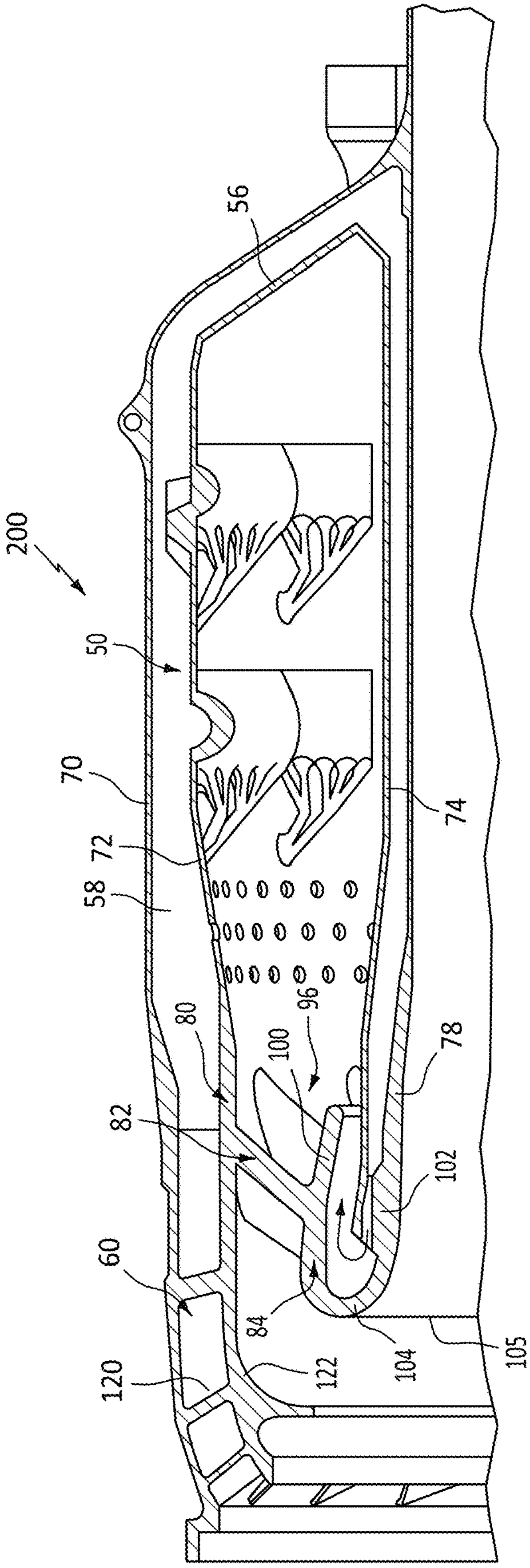
FIG. 3 is a schematic representation of a single-piece diffuser/combustor/turbine inlet nozzle body.

The diffuser wall 70 extends axially along the axial centerline 22 between and is connected to the compressor wall 68 and an aft end portion of the inner turbine wall 78. The diffuser wall 70 is spaced/displaced radially outboard from and axially overlaps the combustor 50. The diffuser wall 70 of FIG. 2 thereby forms an outer peripheral boundary of the diffuser plenum 58 that surrounds the combustor 50 and the combustor wall 72 locally forms an inner boundary. FIG. 3 also shows diffuser vanes 120 radially between a forward portion of the diffuser wall 70 and an inner wall 122 that merges with the outer platform 80 which, in turn, merges with the combustor outer wall 72.

The outer combustor wall 72 extends axially along the axial centerline 22 between and may be connected to the bulkhead wall 56 and an outer platform 80 of an exit nozzle or turbine nozzle vane 82 from the combustion chamber 52. The inner combustor wall 74 is circumscribed and axially overlapped by the outer combustor wall 72. The inner combustor wall 74 extends axially along the axial centerline 22 between and may be connected to the bulkhead wall 56 and an inner platform 84 of the turbine nozzle vane 82. The bulkhead wall 56 extends radially between and is connected to aft end portions of the outer combustor wall 72 and the inner combustor wall 74. The case walls 56, 72 and 74 may thereby collectively form peripheral boundaries of the combustion chamber 52 therebetween.

The outer turbine wall 76 may be connected to the exit nozzle outer platform 80. The outer turbine wall 76 projects axially out from the exit nozzle outer platform 80 and extends axially towards/to an aft, downstream end of an inner platform or hub 86 of the compressor rotor 42 (seen in FIG. 2). This outer turbine wall 76 is circumscribed and axially overlapped by the diffuser wall 70. The outer turbine wall 76 of FIG. 2 may thereby form an inner peripheral boundary of the core flow path 40 within the diffuser 60 and may form an outer peripheral boundary of the core flow path 40 within a (e.g., upstream) portion of the turbine section 32. The outer turbine wall 76 of FIG. 2 also circumscribes, axially overlaps and thereby houses a (e.g., upstream) portion of the turbine rotor 44.

The inner turbine wall 78 may be connected to the exit nozzle inner platform 84. An upstream portion of the inner turbine wall 78 projects axially (in the aft-to-forward direction) out from the exit nozzle inner platform 84 to a turning portion of the inner turbine wall 78. A downstream portion of the inner turbine wall 78 projects axially (in the forward-to-aft direction) away from the inner turbine wall turning portion to the turbine section outlet 66. The inner turbine wall 78 is circumscribed and axially overlapped by the combustor 50. The inner turbine wall 78 is also spaced/displaced radially inboard from the combustor 50. The inner turbine wall 78 of FIG. 2 thereby forms an inner peripheral boundary of the diffuser plenum 58 that surrounds the combustor 50. The inner turbine wall 78 forms an outer peripheral boundary of the core flow path 40 within a (e.g., downstream) portion of the turbine section 32. The inner turbine wall 78 also circumscribes, axially overlaps and thereby houses a (e.g., downstream) portion of the turbine rotor 44.

The static engine structure 34 may also include one or more internal support structures with one or more support members. Examples of support members include, but are not limited to, struts, structural guide vanes, bearing supports, bearing compartment walls, etc. The static engine structure 34 of FIG. 2, for example, includes a forward support structure 88, an aft support structure 90, a compressor inlet nozzle 92 and the turbine nozzle vane 82. The forward support structure 88 and the compressor inlet nozzle 92 may be configured together. The forward support structure 88 may be configured to support the forward bearing 48A. The aft support structure 90 may be configured to support the aft bearing 48B. The compressor inlet nozzle 92 may be configured to condition the core air entering the compressor section 28. The compressor inlet nozzle 92, for example, may include one or more compressor inlet guide vanes 94 which impart swirl to the core air. The turbine nozzle vane 82 may similarly be configured to condition the combustion products exiting the combustor section 30. The turbine nozzle vane 82, for example, may include one or more turbine nozzle guide vanes 96 which import swirl to the combustion products, where these turbine nozzle guide vanes 96 are connected to and extend radially between the exit nozzle inner and outer platforms 84 and 80. The static engine structure 34, of course, may also or alternative include various other static/stationary gas turbine engine components.

As discussed above, in an example engine having a reverse flow combustor, an example high pressure turbine (HPT) vane has an outer diameter shroud and an inner diameter platform. The example platform is of generally c-shaped central longitudinal section, having: an outer diameter wall at inner diameter ends of the airfoils; an inner diameter wall spaced radially inward thereof; and forward turn joining those walls. The outer diameter wall generally forms an inner diameter boundary of the gas path exiting the combustor; the platform turn then forms the inside/aft boundary of a turn of the gas path radially inward toward the turbine inlet; and the inner diameter wall then forms the outer diameter boundary of the gas path at or near the turbine section outlet.

Figure 4:
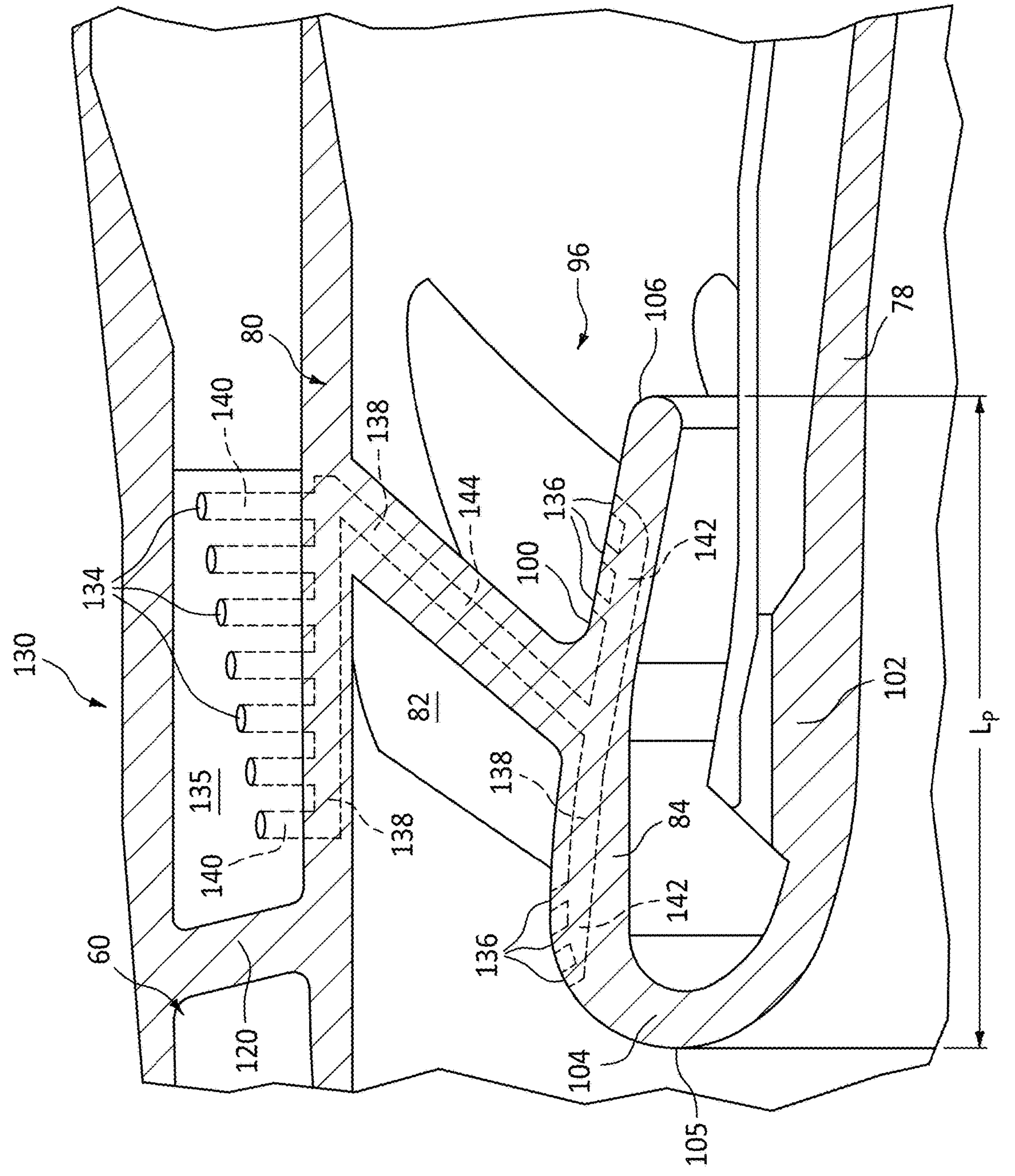
FIG. 4 is a schematic representation of a transverse sectional view of the nozzle section of FIG. 3.

In service, the outer diameter surface of the inner platform outer diameter (OD) wall (100 in the FIG. 3 example) may be exposed to some of the hottest temperatures in the engine due to immediate exposure to gas leaving the combustor. Gas expansion in the turbine may cause a reduction in temperature from upstream to downstream over the gas path-facing surface of the platform (the outer/forward surface of the platform turn 104 and then the ID surface of the ID wall 102). Such temperature gradient can result in differential thermal expansion of the ID wall 102 and OD wall 100. As shown in FIG. 4, as a characteristic platform length for the example reverse flow C-sectioned platform 84, a length $L_p$ is defined as from the leading edge 106 of the platform to the forward extreme 105 of the turn 104.

In service, the compressor section 28 discharge flow through flow path 40 across the compressor diffuser vanes 120 can develop flow separation. The flow separation occurring in the compressor diffuser airfoil section can negatively impact performance.

Figure 5:
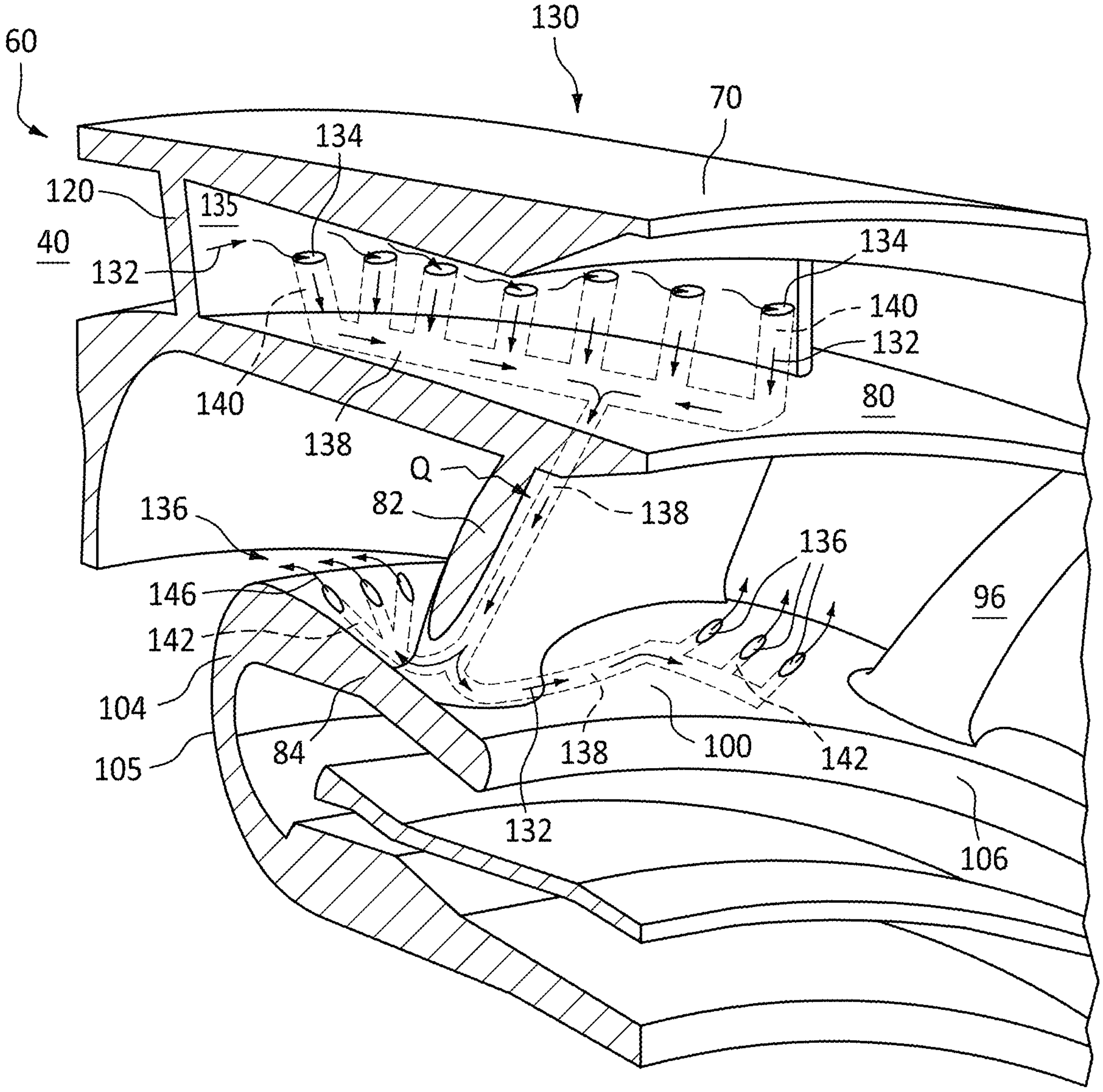
FIG. 5 is a schematic representation of exemplary compressor diffuser vane and turbine vane flow network.

Referring also to FIG. 4 and FIG. 5 an exemplary compressor diffuser vane and turbine vane flow network 130 ("flow network 130"). The flow network 130 can be employed to prevent flow separation from the compressor diffuser vanes 120 as well as provide turbine nozzle vane 82 cooling. The flow network 130 flows air 132 taken from diffuser flow path 40 into suction points 134 formed in the suction side 135 of the diffuser vane 120 out film holes 136 formed in the inner platform 84.

The flow network 130 includes a main artery 138 fluidly coupled to multiple suction points 134 via suction flow passages 140. The suction points 134 can be shaped as holes or slits. The suction flow passages 140 can be formed within the compressor diffuser vane 120 and lead into the main artery 138 formed within the outer platform 80. The main artery 138 is also formed within the turbine nozzle vane 82 and extends into the inner platform 84. The film holes 136 are supplied the air 132 from the main artery 138 through film hole passages 142. The air 132 can flow from the main artery 138 to the film hole passages 142 and exit out of the film holes 136.

The suction points 134 can prevent the flow separation by maintaining the flow attached to the airfoil on the suction side 135. The suction points 134 accept the air 132 resulting from the pressure differential between the diffuser 60 and the turbine section 32. As the air 132 flows into the suction points 134 the flow passing over the suction side 135 is prevented from flow separation away from the suction side 135.

The air 132 flowing through the turbine nozzle vane 82 can remove thermal energy Q from the turbine nozzle vane 82 produced from exposure to the hot gases flowing across the turbine nozzle vane 82. The inherent roughness of the surfaces of the main artery 138 within the turbine nozzle vane 82 can enhance the heat transfer from the turbine nozzle vane 82 to the air 132 flowing through the main artery 138. In an exemplary embodiment, the main artery 138 within the turbine nozzle vane 82 can be configured into multiple and/or serpentine cooling passages 144. In an exemplary embodiment, at least one of the turbine nozzle vanes 82 can include the cooling passages 144.

The air 132 exiting the film holes 136 can produce a film layer 146 over the surface of the inner platform 84 providing an insulating protective function from the hot gases flowing toward the turbine section 32. The film holes 136 can be configured at film cooling hole angles that create the film layer 146. The film holes 136 can also reduce separation on the inner turbine wall of the turbine exit nozzle inner platform 84 proximate the forward extreme 105 of the turn 104 as the flow 40 prepares to make a sharp 90 degree turn inboard towards the turbine rotor 44. The film holes 136 can be sized to account for the expansion of the air 132 as it is heated within the turbine nozzle vane 82.

In an exemplary embodiment, the main artery 138 can supply air 132 to film holes 136 downstream of the turbine nozzle vane 82 as well as proximate the leading edge of platform 106. It is contemplated that the air 132 employed for suppression of the separation and cooling can be less than 10 percent of core flow 40 compressor discharge at the diffuser 60.

The network of suction flow passages 140, main artery 138 and film hole passages 142 can be adjusted to facilitate power extraction and mitigate extraneous post processing cost.

A technical advantage of the disclosed compressor diffuser vane and turbine vane flow network includes preventing flow separation of air away from the compressor diffuser airfoil section.

Another technical advantage of the disclosed compressor diffuser vane and turbine vane flow network includes improved cooling for the turbine nozzle vane.

Another technical advantage of the disclosed compressor diffuser vane and turbine vane flow network includes improved turbine vane life and efficiency from improved cooling and reduced flow separation.

Another technical advantage of the disclosed compressor diffuser vane and turbine vane flow network includes improvement in specific thrust as the engine can operate at higher turbine inlet temperatures responsive to the cooling benefit on the turbine vanes.

There has been provided a compressor diffuser vane and turbine vane flow network. While the compressor diffuser vane and turbine vane flow network has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A compressor diffuser vane and turbine nozzle vane flow network comprising:

at least one suction point formed in a suction side of the compressor diffuser vane;

a suction flow passage fluidly coupled to the at least one suction point;

a main artery formed within an outer platform, the outer platform in operative communication with the compressor diffuser vane, the main artery formed within the turbine nozzle vane, the turbine nozzle vane in operative communication with the outer platform, the main artery formed within an inner platform, the inner platform in operative communication with the turbine nozzle vane;

film hole passages fluidly coupled to the main artery;

at least one film hole formed in the inner platform, the at least one film hole fluidly coupled to the main artery;

wherein the at least one film hole is formed in a gas path-facing surface of the inner platform within an outer forward surface of a platform turn, the platform turn defined by a portion of the inner platform located in a space where a gas path turns around a reverse flow C-section of the inner platform; wherein the outer forward surface of the platform turn is downstream of a platform leading edge of the inner platform, wherein the inner platform is of generally c-shaped central longitudinal section, having an outer diameter wall at inner diameter ends; an inner diameter wall spaced radially inward thereof; and a forward turn joining the outer diameter wall and the inner diameter wall; the outer diameter wall forms an inner diameter boundary of the gas path exiting a combustor within the gas path, the platform turn forms an inside/aft boundary of a turn of the gas path radially inward toward a turbine inlet.

2. The compressor diffuser vane and turbine vane flow network according to claim 1, wherein the suction flow passage is formed within the compressor diffuser vane.

3. The compressor diffuser vane and turbine vane flow network according to claim 1, wherein the main artery formed within the turbine nozzle vane includes multiple cooling passages configured in a serpentine pattern.

4. The compressor diffuser vane and turbine vane flow network according to claim 1, wherein the at least one film hole is configured to produce a film layer over the inner platform providing an insulating protective function from hot gases flowing toward a turbine section.

5. The compressor diffuser vane and turbine vane flow network according to claim 1, wherein the at least one suction point is configured to prevent a flow separation from the suction side by maintaining flow attached to the suction side of the compressor diffuser vane.

6. The compressor diffuser vane and turbine vane flow network according to claim 1, wherein the main artery within the turbine nozzle vane is configured such that air flowing within the main artery removes thermal energy from the turbine nozzle vane, the thermal energy being produced from exposure to hot gases flowing across the turbine nozzle vane.

7. A gas turbine engine with a compressor diffuser vane and turbine nozzle vane flow network comprising:

a compressor section including a compressor diffuser vane;

a reverse flow combustor downstream from the compressor diffuser vane;

a turbine section including a turbine nozzle vane downstream from the compressor diffuser vane and reverse flow combustor;

at least one suction point formed in a suction side of the compressor diffuser vane;

a suction flow passage fluidly coupled to the at least one suction point;

a main artery formed within an outer platform, the outer platform in operative communication with the compressor diffuser vane, the main artery formed within the turbine nozzle vane, the turbine nozzle vane in operative communication with the outer platform, the main artery formed within an inner platform, the inner platform in operative communication with the turbine nozzle vane;

film hole passages fluidly coupled to the main artery; and at least one film hole formed in the inner platform, the at least one film hole fluidly coupled to the main artery;

wherein the at least one film hole is formed in a gas path-facing surface of the inner platform within an outer forward surface of a platform turn, the platform turn defined by a portion of the inner platform located in a space where a gas path turns around a reverse flow C-section of the inner platform between an inner platform outside diameter wall and an inner platform inside diameter wall, wherein the outer forward surface of the platform turn is downstream of a platform leading edge of the inner platform; wherein the gas path reverses direction a first time extending from a diffuser plenum surrounding the reverse flow combustor into a combustion chamber of the reverse flow combustor and the gas path then reverses direction a second time around the reverse flow C-section of the inner platform as the gas path extends from the combustion chamber into the turbine section.

8. The gas turbine engine according to claim 7, wherein the suction flow passage is formed within the compressor diffuser vane.

9. The gas turbine engine according to claim 7, wherein the at least one film hole is configured to produce a film layer over the inner platform providing an insulating protective function from hot gases flowing toward the turbine section.

10. The gas turbine engine according to claim 7, wherein the at least one suction point is configured to prevent a flow separation from the suction side by maintaining flow attached to the suction side of the compressor diffuser vane.

11. The gas turbine engine according to claim 7, wherein the main artery within the turbine nozzle vane is configured such that air flowing within the main artery removes thermal energy from the turbine nozzle vane, the thermal energy being produced from exposure to hot gases flowing across the turbine nozzle vane.

12. A process for a compressor diffuser vane and turbine nozzle vane flow network comprising:

forming a compressor section including a compressor diffuser vane;

reverse flow combustor downstream from the compressor diffuser vane;

forming a turbine section including a turbine nozzle vane downstream from the compressor diffuser vane and the reverse flow combustor;

forming at least one suction point in a suction side of the compressor diffuser vane;

forming a suction flow passage fluidly coupled to the at least one suction point;

forming a main artery within an outer platform, the outer platform in operative communication with the compressor diffuser vane;

forming the main artery within the turbine nozzle vane, the turbine nozzle vane in operative communication with the outer platform;

forming the main artery within an inner platform, the inner platform in operative communication with the turbine nozzle vane;

fluidly coupling film hole passages to the main artery;

forming at least one film hole in a gas path-facing surface of the inner platform within an outer forward surface of a platform turn, the platform turn defined by a portion of the inner platform located in a space where a gas path turns around a reverse flow C-section of the inner platform between an inner platform outside diameter wall and an inner platform inside diameter wall, wherein the outer forward surface of the platform turn is downstream of a platform leading edge of the inner platform; wherein the gas path reverses direction a first time extending from a diffuser plenum surrounding the reverse flow combustor into a combustion chamber of the reverse flow combustor and the gas path then reverses direction a second time around the reverse flow C-section of the inner platform as the gas path extends from the combustion chamber into the turbine section; and fluidly coupling the at least one film hole to the main artery.

13. The process of claim 12, further comprising:

forming the suction flow passage within the compressor diffuser vane.

14. The process of claim 12, further comprising:

forming the main artery within the turbine nozzle vane as multiple cooling passages configured in a serpentine pattern.

15. The process of claim 12, further comprising:

configuring the at least one film hole to produce a film layer over the inner platform providing an insulating protective function from hot gases flowing toward the turbine section.

16. The process of claim 12, further comprising:

configuring the at least one suction point to prevent a flow separation from the suction side by maintaining flow attached to the suction side of the compressor diffuser vane.

17. The process of claim 12, further comprising:

configuring the main artery within the turbine nozzle vane to flow air within the main artery to remove thermal energy from the turbine nozzle vane, the thermal energy being produced from exposure to hot gases flowing across the turbine nozzle vane.

* * * * *